Sept. 15, 1936.  A. L. FREEDLANDER  2,054,619
BELT
Filed Feb. 21, 1934  2 Sheets-Sheet 1
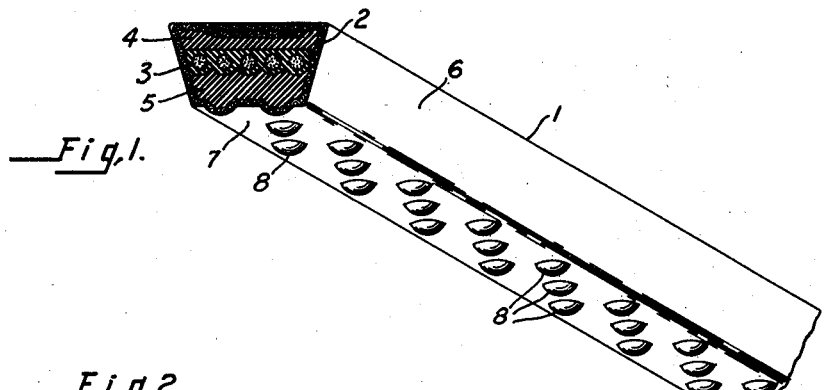
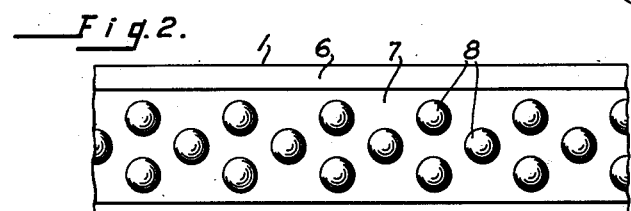 
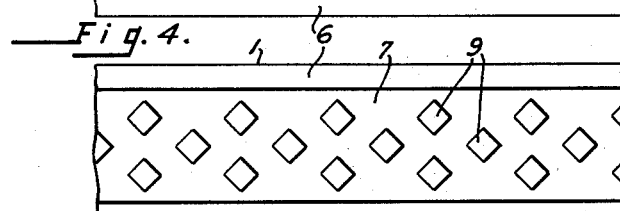 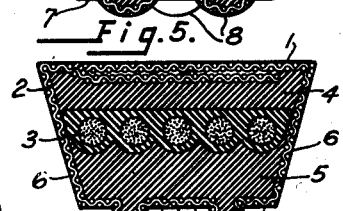
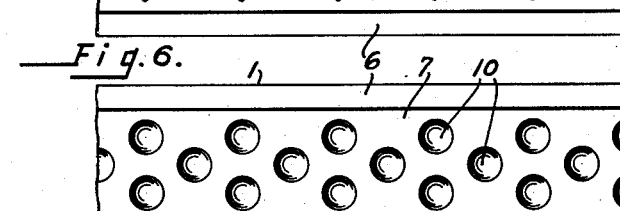 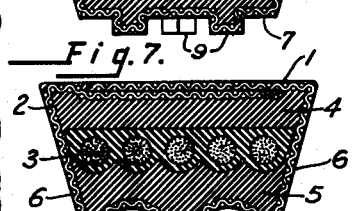
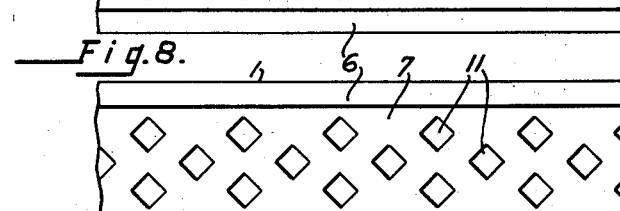 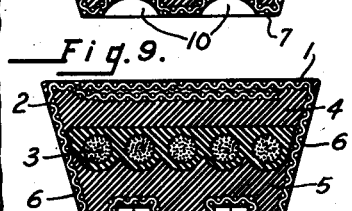
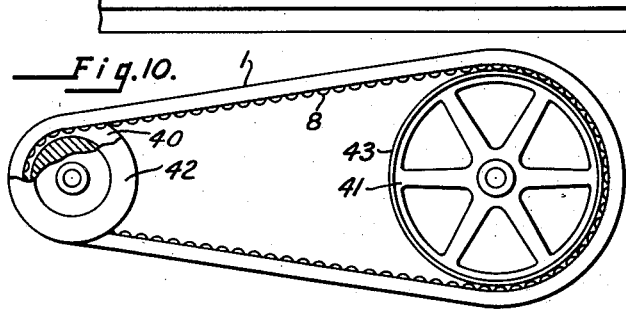
INVENTOR
ABRAHAM L. FREEDLANDER.
BY
ATTORNEYS Sept. 15, 1936.  A. L. FREEDLANDER  2,054,619
BELT
Filed Feb. 21, 1934   2 Sheets-Sheet 2
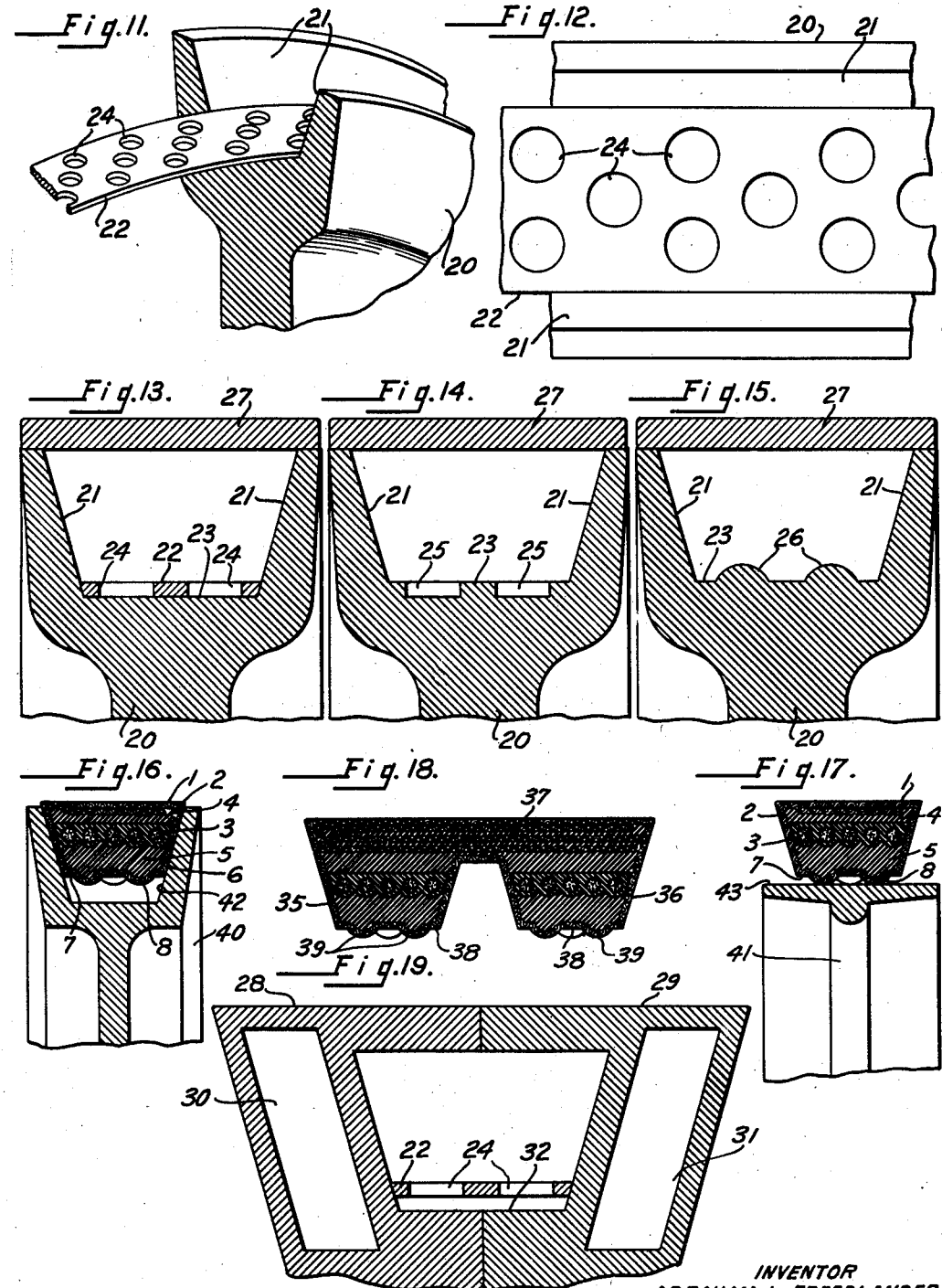
INVENTOR
ABRAHAM L. FREEDLANDER.
BY
ATTORNEYS Patented Sept. 15, 1936

2,054,619

UNITED STATES PATENT OFFICE 2,054,619

BELT

Abraham L. Freedlander, Dayton, Ohio, assignor to The Dayton Rubber Manufacturing Company, Dayton, Ohio, a corporation of Ohio Application February 21, 1934, Serial No. 712,374

1 Claim. (Cl. 74—233)

This invention relates to belts, and especially to fabric-and-rubber belts.

The problem of this invention was to provide a belt drive between a grooved pulley and a flat-edged pulley without causing objectionable noise, the belt engaging the sidewalls of the grooved pulley and the peripheral surface of the flat-edged pulley; also a process of making the belt.

One object of this invention is to provide a belt capable of driving or being driven either from its sidewalls or its inner or outer surfaces, with means provided to eliminate objectionable noise.

Another object is to provide a combined fabric-and-rubber belt having inclined sidewalls and an inner surface provided with portions on different levels.

Another object is to provide a combined fabric-and-rubber belt with inclined sidewalls and protuberances or depressions upon its inner surface, either with or without a wrapper.

Another object is to provide a process of making a belt with slight protuberances or depressions on one of its driving surfaces.

In the drawings:

Figure 1 is a perspective view of a section of belt according to my invention, with rounded protuberances on the inner surface thereof;

Figure 2 is a bottom plan view of the belt shown in Figure 1;

Figure 3 is a cross section through the belt shown in Figure 1;

Figure 4 is a bottom plan view of a modified form of belt similar to that of Figure 1, but with diamond-shaped protuberances;

Figure 5 is a cross section through the belt shown in Figure 4;

Figure 6 is a bottom plan view of a belt similar to Figure 1, but having round depressions in its inner surface;

Figure 7 is a cross section through the belt shown in Figure 6;

Figure 8 is a bottom plan view of a belt similar to Figure 1, but having diamond-shaped depressions in its inner surface;

Figure 9 is a cross section through the belt shown in Figure 8;

Figure 10 is a diagrammatic view of the belt shown in Figure 1, illustrated as furnishing a drive between a grooved pulley and a flat-edged pulley;

Figure 11 is a perspective view of apparatus used in making the belt of Figure 1;

Figure 12 is an enlarged top plan view of Figure 11;

Figure 13 is a cross section through the apparatus shown in Figure 11;

Figure 14 is a modified form of apparatus with the parts thereof in an integral construction;

Figure 15 is a further modification of the apparatus of Figure 11, furnishing depressions in the belt made therewith;

Figure 16 is a partial radial section through the grooved pulley of Figure 10, showing the bent sidewalls engaging the sidewalls of the pulley groove;

Figure 17 is a radial section through the flat-edged pulley of Figure 10, showing the inner surface of the belt and its protuberances engaging the flat edge of the pulley;

Figure 18 is a double-V belt with protuberances according to my invention;

Figure 19 is a modified form of mould used in producing the belt of my invention.

Previously it has been found that belt drives are occasionally necessary in connecting a grooved pulley with a flat pulley. The belt engages the side walls of the grooved pulley but the flat periphery of the flat-edged pulley. Such arrangements have found frequent application to mechanical refrigerating machines but have often been objectionable on account of noise. a slippage has also arisen between the inner surface of the belt and the flat-edged pulley.

Referring to the drawings in detail, Figure 1 shows a section of a belt 1 which is composed of alternate layers of fabric and rubber-like material either with or without a wrapper. The form shown in Figure 1 is a provided with a wrapper 2 which encloses the interior of the belt. The neutral axis of the belt is provided with tightly twisted cords 3 embedded therein and making the belt substantially inextensible along its neutral axis. The upper internal portion 4 of the belt may employ alternate layers of fabric woven in such a manner as to provide longitudinal extensibility with comparative lateral inextensibility. One means of providing this arrangement is to use bias-laid fabrics in the upper portion 4 of the belt. The lower internal portion 5 of the belt may be of solid rubber, or impregnated with fabric fibers arranged in such a manner as to give a slight amount of compressibility thereto. In this manner the belt is comparatively inextensible along its neutral axis, hence is not liable to slacken under conditions of continued operation. The upper portion 4, however, will extend slightly and the lower portion 5 compress correspondingly when the belt is passing around pulleys.

The side walls 6 of the belt are inclined to fit the inclined sidewalls of the pulley groove, and are smooth in configuration. The inner surface 7 of the belt, however, is provided with portions of different levels. In Figure 1 these portions comprise circular protuberances 8 rising above the remaining surface 7 of the belt.

These surface portions of different levels may, however, be either raised or depressed relative to one another. In Figure 2 the protuberances 8 are shown in greater detail, and are circular in outline. In Figure 4, however, the protuberances 9 are of diamond shape. It is to be understood that any desired shape may be used for these protuberances. In Figures 6 and 8, however, the surface portions of different levels are depressed portions 10, sunk below the level of the inner surface 7 of the belt. The depressions 10 of Figure 6 are circular, whereas the depressions 11 of Figure 8 are diamond-shaped. Here again, the depressions may be of any desired outline.

The end of the depressions or protuberances may be either rounded, as shown in Figures 3 and 7, or flat, as in Figures 5 and 9.

The provision of these surface portions of different levels permits the use of a fabric cover which may be coated with rubber on both sides. Such a wrapper is more economical to make and easier to apply than the fabric cover hitherto used, which has had rubber on its internal surface only. Hitherto the use of rubber on the outside of the fabric cover or wrapper 2 has caused squeaking due to the engagement thereof with the flat-edged surface of the pulley. By the applicant's present invention, the outside of the wrapper may be coated with rubber as well as the inside, since the small amount of rubber on the surface portions of higher level on the inside surface of the belt will wear off quickly, leaving only the canvas surface of the wrapper exposed. This exposed canvas surface on the portions of higher level gives excellent adhesion, yet without slipping and without squeaking. The holding power of the belt is increased by the suction effect created between the areas of low and high level, yet without a corresponding increase in the noise of operation. It is to be understood, however, that the surfaces of different level may be applied directly to the inner surface of a belt lacking a wrapper on that surface.

In general, the method of making this belt employs the use of moulds, as is understood by those skilled in the art. The protuberances, however, are additionally provided by a special arrangement of the moulds. In Figures 11 to 13 is shown a mould 20 having tapering sidewalls 21 adapted to form the tapering sidewalls of the belt 1. The protuberances on the inner surface of the belt, however, are conveniently formed by placing a perforated strip 22 along the bottom wall 23 of the mould, the perforations 24 being of any desired shape. A convenient thickness for this perforated strip has been found to be 0.030 inches.

The provision of the perforated strip 22 simplifies the making of the mould, and decreases the expense of doing so. It will be understood, however, that the depressions may be formed directly in the mould, as shown by the depressions 25 in Figure 14.

It will be further understood that the strip 22 may be provided with raised portions, as by the use of variously-headed rivets, thereby providing means for creating depressions 10 or 11 in the inner surface 7 of the belt. As before, the projecting portions may be formed directly on the mould, as shown by the projections 26 in Figure 15, but the use of the projections on the strip 22 simplifies the mould construction and reduces its cost.

In the use of the mould 20, the pre-formed belt is placed therein after the strip 22 has been inserted, and the cover plate 27 placed in position. The mould is then locked and vulcanization caused to take place. The expansion of the belt during the vulcanization process results in the pressing of a portion of the inner surface 7 into the perforations 24 or 25, or around the projections 26, thereby creating the surfaces of different level on the inner surface 7 of the belt. By this method standard moulds can be used while different forms, spacings, sizes and configuration of projections or depressions can be supplied through the use of the strips 22.

A slightly modified form of mould, but employing essentially the same principle, is shown in Figure 19. Here the mould consists of two halves 28 and 29, with vulcanization spaces 30 and 31. The strip 22 is provided as before, and is here shown as slightly raised from the bottom surface 32 of the mould halves. The strip 22, however, may be placed directly in contact with the mould surface 32 if desired. In using the mould of Figure 19, the preformed belt is placed in the mould together with the strip 22, and the mould halves 28 and 29 locked together. Vulcanization is then caused to take place, and the expansion of the belt results in the projections or depressions being formed therein as in the manner previously described for the moulds 20 shown in Figures 11 to 15.

In Figure 18 is shown a belt with double-V portions 35 and 36 joined by a bridge portion 37 and provided with surface portions of different level 38 and 39. The surface portions 39 are shown as protuberances, but depressions may be provided if desired. The double-V belt of Figure 18 may be made by using a double mould, but otherwise following the similar process steps and procedure as previously described.

In operation, the belt 1 (Figures 10, 16 and 17) is shown as providing a driving connection between the grooved pulley 40 and the flat-edged pulley 41. The sidewalls 6 of the belt engage the sidewalls 42 of the grooved pulley 40, yet the inner surface protuberances 8 of the belt engage the flat periphery 43 of the flat-edged pulley 41 (Figures 16 and 17). As the inner surface 7 of the belt passes over the flat edge 43 of the pulley 41, a suction is created between the raised portions 8 and the surface 7, resulting in increased gripping power. At the same time, however, the rubber coating on the wrapper, if used wears away on the projections 8, exposes the canvas surface thereunderneath, and silences any substantial squeaking which the belt might otherwise produce.

It will be understood that where the term "rubber" is used in the specification and claim hereof, it is intended to cover the use of rubber-like substances or other materials equivalent to or having generally similar action to rubber under the conditions of use of the belt of my invention.

This provision of protuberances or depressions, as described herein, substantially eliminates squeaking, but ordinarily allows some slippage to take place. A slight amount of such slippage is occasionally found beneficial because it wears the rubber off the protuberances more quickly and also smoothens sudden shocks to the machine when starting or undergoing heavy impulses. The slippage can be reduced, however, by deepening the non-skid portions of the belt as well as by changing its design somewhat.

It will be understood that I desire to comprehend within my invention such modifications as may be necessary to adapt it to varying conditions and uses.

Having thus fully described my invention, what I claim as new and desire to secure by Letters Patent is:

A belt having an inner wall with laterally and longitudinally spaced bosses in series and separated by flat surfaces thereon, and a fabric wrapper covering the surface defined by the bosses and intermediate flat surfaces, said covering having its outer surface covered with rubber whereby the rubber will be worn away from the higher levels of said wrapper covering the bosses to expose the fabric portions therebeneath.

ABRAHAM L. FREEDLANDER.